United States Patent

Ichikawa et al.

Patent Number: 5,305,041
Date of Patent: Apr. 19, 1994

[54] REMOTELY CONTROLLABLE CAMERA SYSTEM

[75] Inventors: Yuichi Ichikawa; Masahiro Hayakawa; Kosei Kosako, all of Tokyo, Japan

[73] Assignee: Asahi Kogaku Kogyo Kabushiki Kaisha, Tokyo, Japan

[21] Appl. No.: 3,866

[22] Filed: Jan. 11, 1993

Related U.S. Application Data

[63] Continuation of Ser. No. 790,352, Nov. 12, 1991, abandoned.

[30] Foreign Application Priority Data

Nov. 16, 1990 [JP] Japan ............... 2-119982[U]

[51] Int. Cl.⁵ ............... G03B 17/38; G03B 39/00; G03B 15/03
[52] U.S. Cl. ............... 354/266; 354/67; 354/131
[58] Field of Search ............... 354/75, 76, 129, 266, 354/131

[56] References Cited

U.S. PATENT DOCUMENTS

| | | | |
|---|---|---|---|
| 3,899,245 | 8/1975 | Bernhardt | 354/354 |
| 4,252,426 | 2/1981 | Kuraishi | 354/64 |
| 4,368,967 | 1/1983 | Imura | 354/106 |
| 4,905,315 | 2/1990 | Solari et al. | 318/640 |
| 5,014,080 | 5/1991 | Miyadera | 354/403 |
| 5,029,309 | 7/1991 | Jones | 354/129 |
| 5,047,793 | 9/1991 | Shiomi | 354/238.1 |
| 5,159,375 | 10/1992 | Taniguchi et al. | 354/400 |

*Primary Examiner*—Michael L. Gellner
*Assistant Examiner*—Nicholas J. Tuccillo
*Attorney, Agent, or Firm*—Sandler, Greenblum & Bernstein

[57] ABSTRACT

A remotely controllable camera system has a photodetector mounted in a camera housing and facing a front panel thereof. The photodetector detects an external optical command signal beam applied thereto through the front panel. The camera system also has an optical fiber for guiding an external optical command signal beam applied through a rear panel of the camera housing toward the photodetector. The external optical command signal beam is transmitted from an infrared remote controller which may be positioned in front of or behind the camera. The camera has an electrically controllable shutter that can be released in response to the external optical command signal beam detected by the photodetector.

9 Claims, 4 Drawing Sheets

REMOTELY CONTROLLABLE CAMERA SYSTEM

This application is a continuation of application Ser. No. 07/790,352, filed Nov. 12, 1991, now abandoned.

The present disclosure relates to subject matter contained in Japanese utility model application No. 2-119982 (filed on Nov. 16, 1990) which is expressly incorporated herein by reference in its entirety.

BACKGROUND OF THE INVENTION

1. Field of the Invention

The present invention relates to a camera that can be remotely controlled with a signal beam, and more particularly to such a remotely controlled camera having a receiver assembly for receiving a remote control signal beam transmitted from either the front or rear side of the camera.

2. Description of the Prior Art

Some conventional cameras can be remotely controlled by a separate remote controller that emits a signal beam representing remote control command information for remote control of the operation of a shutter mechanism, or the like, from a remote position.

Generally, such remotely controllable cameras have a photodetector device such as a photodiode, a phototransistor, a cadmium cell, or the like for detecting the signal beam emitted from the remote controller. The photodetector device is usually arranged to receive a signal beam transmitted from only one side of the photodetector device.

It has been customary, for the user of a remotely controllable camera to be positioned in front of the camera and to operate the remote controller to release the shutter of the camera, to thereby photograph the user with the camera. Therefore, the photodetector device is attached to the front side of the camera, for receiving the signal beam that is transmitted toward the front side of the camera.

Various attempts have heretofore been made to develop remotely controllable cameras that can be remotely controlled by remote controllers in a wider space area, i.e., with less directivity.

According to one proposal, a remotely controllable camera has a photodetector on the front side of the camera for receiving a signal beam transmitted from the front side and another photodetector on the rear side of the camera for receiving a signal beam transmitted from the rear side. Therefore, the camera can be remotely controlled by a remote operator, irrespective of whether the remote operator is positioned in front of or behind the camera. However, the proposed camera is relatively costly to manufacture because of the two photodetectors and associated lead wires required. Another problem is that the lead wires connected to the two photodetectors are long enough to easily pick up external noise, resulting in remote control malfunctions of the camera.

SUMMARY OF THE INVENTION

In view of the aforesaid drawbacks of the conventional remotely controllable cameras, it is an object of the present invention to provide a remotely controllable camera system which is less costly to manufacture, and which also requires a relatively small number and length of lead wires involved in the reception of remote control signal beams, so that the camera system is prevented from malfunctioning when it is remotely controlled.

According to the present invention, there is provided a camera system comprising a camera housing having first and second panels, and a photodetector mounted in the camera housing and facing the first panel, for detecting an external optical command signal beam applied thereto through the first panel. An optical guide, for guiding an external optical command signal beam applied through the second panel toward the photodetector, a controllable mechanism disposed in the camera housing, and a control mechanism for controlling the controllable mechanism in response to the external optical command signal beam detected by the photodetector are also provided.

According to the present invention, the camera system further comprise a camera housing having first and second panels spaced from each other, a remote controller, separate from the camera housing, for transmitting an external optical command signal beam, and a photodetector mounted in the camera housing and facing the first panel, for detecting the external optical command signal beam applied thereto through the first panel from the remote controller. An optical guide, disposed between the first and second panels, for guiding the external optical command signal beam applied through the second panel from the remote controller toward the photodetector, an electrically controllable mechanism disposed in the camera housing, and an electronic control mechanism for producing an electric signal to control the electrically controllable mechanism in response to the external optical command signal beam detected by the photodetector are also provided.

The external optical command signal beam emitted toward the first panel of the camera housing can be directly detected by the photodetector. The external optical command signal beam emitted toward the rear panel of the camera housing is guided through the optical guide and is then detected by the photodetector. Therefore, the photodetector can detect the external optical command signal beam emitted by the remote controller irrespective of whether the remote controller is positioned on the side of the first or second panel of the camera housing, e.g., in front of or behind the camera.

Since the single photodetector can detect external optical command signal beams transmitted from different directions, no additional photodetector is required. Therefore, the cost of the camera system, including the photodetector and its associated lead wires, is relatively low. As the number and length of required lead wires are relatively small, they are resistant to external noise, protecting the camera system from noise-induced malfunctions.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
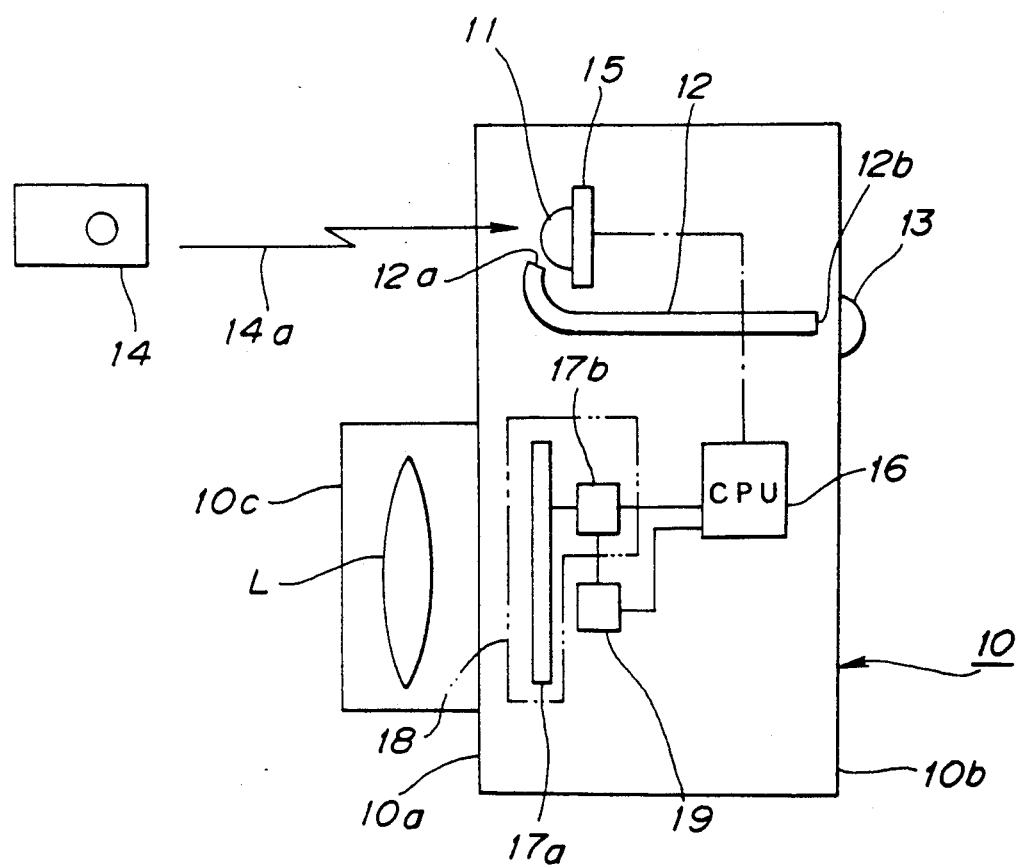
FIG. 1 is a schematic vertical cross-sectional view of a remotely controllable camera system according to an embodiment of the present invention, with a remote controller shown as being positioned in front of a camera.
Figure 2:
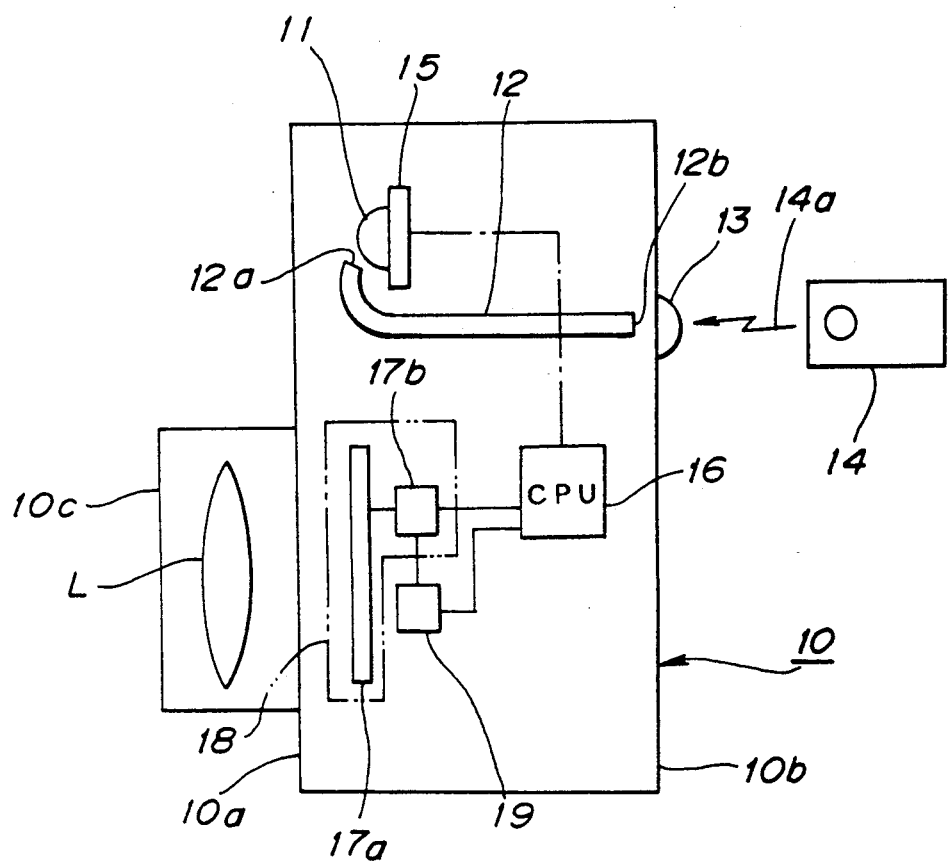
FIG. 2 is a schematic vertical cross-sectional view of the remotely controllable camera shown in FIG. 1, with the remote controller shown as being positioned behind the camera.

FIGS. 1 and 2 schematically show a remotely controllable camera according to an embodiment of the present invention, the camera being remotely controllable by a signal beam that is transmitted from either the front or rear side of the camera.

As shown in FIG. 1, the remotely controllable camera, generally designated by the reference numeral 10, has a lens barrel 10c mounted on a front panel 10a of a camera housing, and supporting a lens system L. The camera 10 can be remotely controlled by a remote controller 14 which emits a signal beam 14a, typically an infrared radiation beam.

The camera 10 has a photodetector 11, sensitive to infrared radiation, the photodetector 11 being disposed in the camera housing and having a light-detecting surface facing the front panel 10a, so that it can directly detect infrared radiation transmitted from only the front side of the camera 10.

The photodetector 11 is electrically connected to an electronic circuit 15 within the camera housing. When the signal beam 14a is applied to the photodetector 11, the electric circuit 15, connected thereto, produces an electric signal depending on a remote control command that is represented by the signal beam 14a.

The camera housing includes a rear panel 10b that supports a condensing lens 13 for converging applied infrared radiation. The infrared radiation that has passed through the lens 13, is applied to one end 12b of an optical fiber 12 disposed within the camera housing.

The optical fiber 12 comprises a core and a cladding, both made of a plastic material. The optical fiber 12 extends between the front and rear panels 10a 10b. More specifically, the end 12b of the optical fiber 12 is positioned near the rear panel 10b immediately behind the condensing lens 13. The optical fiber 12 has an opposite end 12a directed from the front panel 10a toward the photodetector 11. Specifically, an end portion near the end 12a of the optical fiber 12 is located below the photodetector 11 and curved upwardly to position the end 12a close to the photodetector 11a, near its light-detecting surface that faces the front panel 10a.

The camera housing accommodates therein a CPU 16 to which the electric signal from the electronic circuit 15 is applied, a shutter mechanism 18 including a shutter 17a and a shutter charge mechanism 17b for charging the shutter 17a, and a shutter release mechanism 19 for actuating the shutter mechanism 18 to release the charged shutter 17. The CPU 16 controls the shutter release mechanism 19 to release the shutter 17 in response to the electric signal from the electronic circuit 15.

The remote controller 14 serves to remotely control the shutter 17 so that it is released. When a push button (not shown) on the remote controller 14 is pressed, the remote controller 14 emits the infrared signal beam 14a representing remote control command information for releasing the shutter 17.

The camera 10 and the remote controller 14, as shown in FIGS. 1 and 2, operate as follows:

When the remote controller 14 is activated while it is positioned in front of the camera 10, as shown in FIG. 1, the signal beam 14a is emitted by the remote controller 14 and is directly received and detected by the photodetector 11. When the remote controller 14 is activated while it is positioned in back of the camera 10, as shown in FIG. 2, the signal beam 14a is emitted by the remote controller 14 and is guided through the condensing lens 13 and the optical fiber 12 to the light-detecting surface of the photodetector 11, which then detects the signal beam 14a.

When the photodetector 11 detects the signal beam 14a, the electronic circuit 15 produces an electric signal representing the remote control command information to release the shutter 17, and applies the electric signal to the CPU 16. The CPU 16 then controls the shutter release mechanism 19 to enable the shutter mechanism 18 to release the shutter 17.

The single photodetector 11, that is positioned so as to face the front side of the camera 10, is capable of detecting the signal beam 14a transmitted from the remote controller 14 when it is positioned in front of the camera 10, and also the signal beam 14a transmitted from the remote controller 14 when it is positioned behind the camera 10. Accordingly, the camera 10 is not required to have another photodetector for directly detecting a signal beam transmitted from behind the camera 10.

Since only one photodetector 11 is employed, the cost of the camera 10, including the photodetector and its associated lead wires, is relatively low. The single photodetector requires a relatively small number and length of lead wires connected thereto, which are thus relatively highly resistant to external noise. Consequently, the camera 10 is protected from noise-induced malfunctions when it is remotely controlled. The optical fiber 12, for transmitting the signal beam 14a from the condensing lens 13 to the photodetector 11, is also effective to make the remote control command information resistant to external noise.

Figure 3:
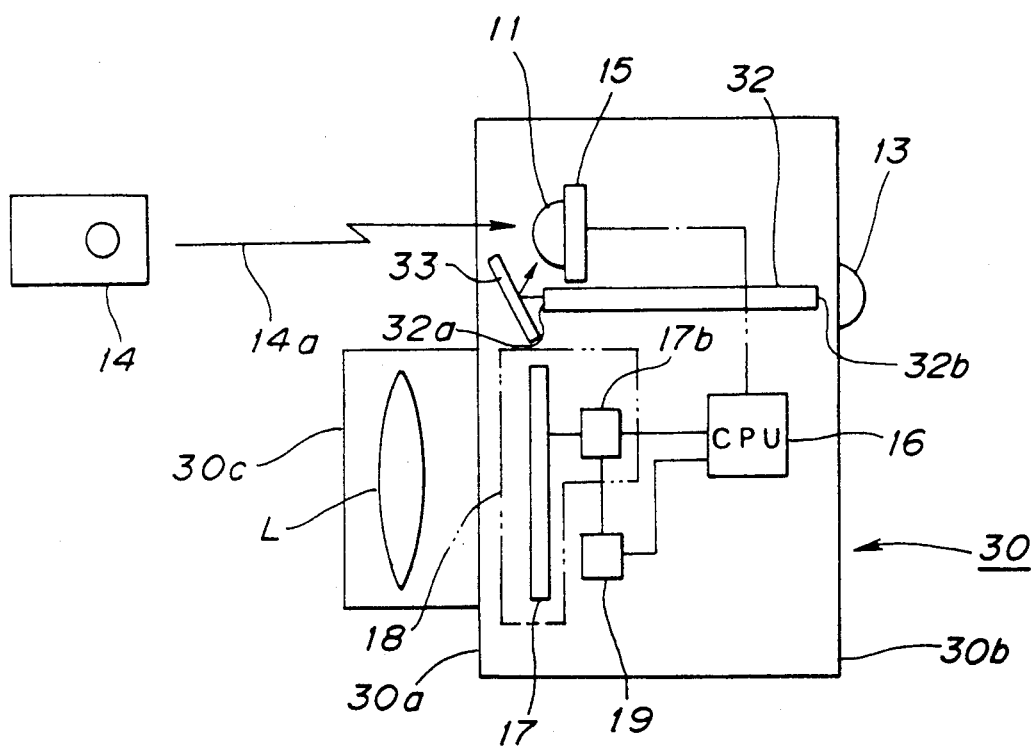
FIG. 3 is a schematic vertical cross-sectional view of a remotely controllable camera system according to another embodiment of the present invention, with a remote controller shown as being positioned in front of a camera.
Figure 4:
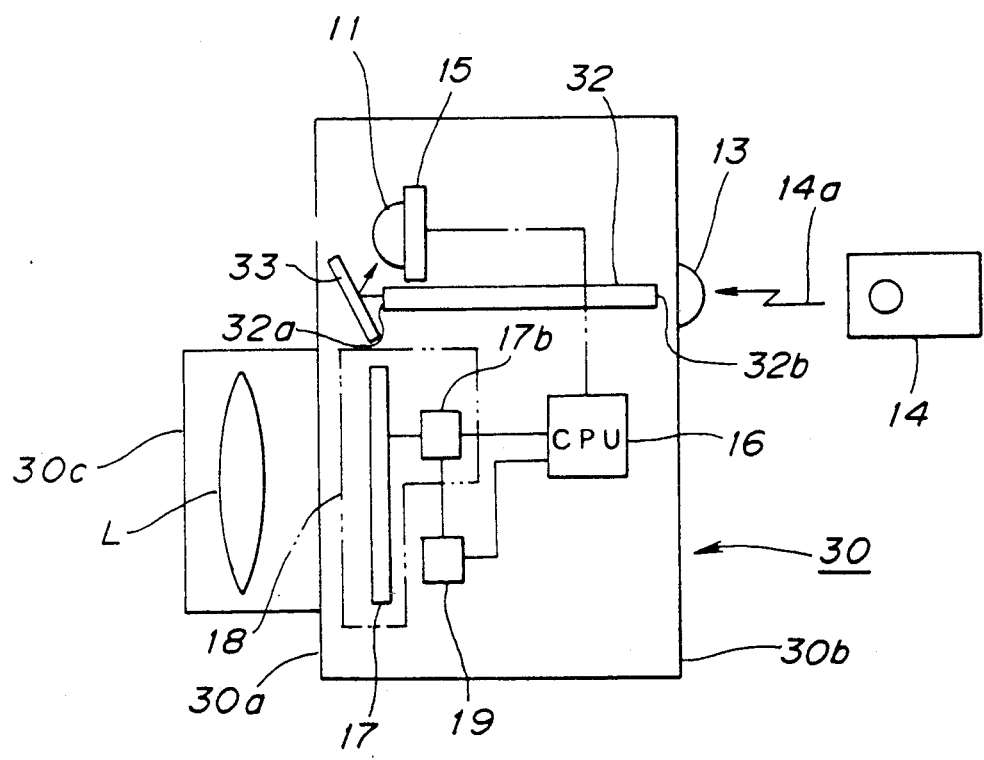
FIG. 4 is a schematic vertical cross-sectional view of the remotely controllable camera shown in FIG. 3, with the remote controller shown as being positioned behind the camera.

FIGS. 3 and 4 schematically show a remotely controllable camera according to another embodiment of the present invention.

Those parts shown in FIGS. 3 and 4 which are identical to those shown in FIGS. 1 and 2 are denoted by identical reference characters, and will not be described in detail.

As shown in FIG. 3, the remotely controllable camera, generally designated by the reference numeral 30, has a lens barrel 30c mounted on a front panel 30a of a camera housing and supports a lens system L. In the camera era housing, there are disposed an optical fiber 32 whose core and cladding are made of a plastic material, and a reflecting mirror 33 positioned near the photodetector 11.

The condensing lens 13 is supported on a rear panel 30b of the camera housing, cutting off visible light and transmitting only infrared radiation therethrough. The optical fiber 32 has an end 32b disposed near and facing the condensing lens 13, so that the infrared radiation that has passed through the condensing lens 13 is applied to the end 32b of the optical fiber 32.

The optical fiber 32 extends from the rear panel 30b toward the front panel 30a, and has an opposite end 32a positioned beneath the photodetector 11. A reflecting mirror 33, is located between the end 32a of the optical fiber 32 and the front panel 30a of the camera housing, and is inclined to reflect a radiation beam from the optical fiber end 32a toward the light-detecting surface of the photodetector 11.

The signal beam 14a transmitted from the remote controller 14 when it is positioned in front of the camera 30, as shown in FIG. 3, is directly received and detected by the photodetector 11. The signal beam 14a, emitted from the remote controller 14 when it is positioned behind the camera 30, as shown in FIG. 4, is guided through the condensing lens 13 and the optical fiber 32, and is then reflected by the reflecting mirror 33, toward the light-detecting surface of the photodetector 11, which detects the signal beam 14a.

Therefore, the camera 30 can be remotely controlled by the remote controller 14, irrespective of whether the remote controller 14 is positioned in front of or behind the camera 30.

The core and cladding of the optical fibers 12, 32 may be made of glass rather than plastic.

The condensing lens 13 may be a filter lens for cutting off visible light, passing only infrared radiation therethrough, so that the applied infrared radiation can reliably be transmitted to the photodetector 11.

Other sets of the optical fiber 12 or the optical fiber 32 and the reflecting mirror 33 may be provided between the photodetector 11 and other panels, such as side panels, of the camera housing so that the photodetector 11 can detect the signal beam transmitted from the remote controller 14, when it is positioned other than in front of or behind the camera 10 or 30.

In the illustrated embodiments, the shutter mechanism 18 is remotely controlled by a radiation beam emitted from the remote controller 14. However, the present invention is also applicable to cameras in which various other mechanisms are remotely controllable by radiation beams emitted from remote controllers.

Although certain preferred embodiments of the present invention have been shown and described in detail, it should be understood that various changes and modifications may be made therein without departing from the scope of the appended claims.

What is claimed is:

1. A camera system comprising:
   a camera housing having first and second panels;
   a photodetector mounted in said camera housing and facing said first panel, for detecting an external optical command signal beam applied through said first panel;
   optical guide means for guiding an external optical command signal beam applied through said second panel toward said photodetector;
   a controllable mechanism disposed in said camera housing; and
   control means for controlling said controllable mechanism in response to the external optical command signal beam detected by said photodetector.

2. A camera system according to claim 1, wherein said first and second panels comprise front and rear panels of said camera housing.

3. A camera system according to claim 1, wherein said optical guide means comprises an optical fiber having a first end disposed near said second panel and a second end disposed near said photodetector.

4. A camera system according to claim 3, wherein said optical fiber has an end portion contiguous to said second end and curved toward said photodetector.

5. A camera system according to claim 3, wherein said optical guide means further includes a reflecting mirror disposed near said photodetector, for reflecting the optical command signal beam from said second end of the optical fiber toward said photodetector.

6. A camera system according to claim 3, wherein said optical guide means further includes a lens mounted on said second panel near said first end of the optical fiber, for converging the optical command signal beam toward said first end.

7. A camera system according to claim 1, wherein said controllable mechanism comprises a shutter mechanism having a shutter and a shutter charge mechanism for charging said shutter, said control means comprising electronic control means for generating an electric signal in response to the external optical command signal beam detected by said photodetector, a shutter release mechanism for releasing said shutter charged by said shutter charge mechanism in response to the electric signal from said electronic control means.

8. A camera system according to claim 1, further including a remote controller for transmitting the external optical command signal beam.

9. A camera system comprising:
   a camera housing having first and second panels spaced from each other;
   a remote controller, separate from said camera housing, for transmitting an external optical command signal beam;
   a photodetector mounted in said camera housing and facing said first panel, for detecting the external optical command signal beam applied through said first panel from said remote controller;
   optical guide means, disposed between said first and second panels, for guiding the external optical command signal beam applied through said second panel from said remote controller toward said photodetector;
   an electrically controllable mechanism disposed in said camera housing; and
   electronic control means for producing an electric signal to control said electrically controllable mechanism in response to the external optical command signal beam detected by said photodetector.

* * * * *